United States Patent [19]

Moedinger et al.

[11] Patent Number: 4,805,747
[45] Date of Patent: Feb. 21, 1989

[54] ARRANGEMENT FOR SUPPLYING COOLING AIR TO A BRAKE DISK

[75] Inventors: Wolfgang Moedinger, Weinstadt; Michael Preiss, Vaihingen/Enz-Aurich; Reinhard Lechner, Pforzheim, all of Fed. Rep. of Germany

[73] Assignee: Dr. Ing. h.c.F. Porsche Aktiengesellschaft, Stuttgart, Fed. Rep. of Germany

[21] Appl. No.: 76,859

[22] Filed: Jul. 23, 1987

[30] Foreign Application Priority Data

Sep. 5, 1986 [DE] Fed. Rep. of Germany ....... 3630334

[51] Int. Cl.⁴ .................... B60T 5/00; F16D 65/84
[52] U.S. Cl. ........................... 188/264 A; 180/68.1; 188/18 A; 188/71.6; 188/264 AA; 188/218 A; 188/264 R; 296/208; 296/1.1; 301/6 R; 301/6 CS
[58] Field of Search ................. 296/15, 91, 194, 208, 296/1 R; 188/264, 71.6, 18, 219, 71.6, 218 A, 218 R; 301/6 CS, 6 WB, 6 R; 180/68.1, 68.2, 157; 192/113 A, 70.12

[56] References Cited

U.S. PATENT DOCUMENTS

| | | | |
|---|---|---|---|
| 878,454 | 2/1908 | Caillet | 188/264 R |
| 2,105,176 | 1/1938 | Ash | 188/264 R |
| 2,136,472 | 11/1938 | Sinclair | 188/264 R |
| 2,198,792 | 4/1940 | Schjolin | 188/264 R |
| 2,777,965 | 1/1957 | Winther | 188/264 R |
| 2,959,255 | 11/1960 | White | 188/264 R |
| 3,059,730 | 10/1962 | Nickell et al. | 188/71.6 |
| 3,233,707 | 2/1966 | Müller et al. | 188/264 R |
| 3,664,467 | 5/1972 | Lucien et al. | 188/71.6 |
| 3,884,516 | 5/1975 | Gallion et al. | 293/117 X |
| 3,933,136 | 1/1976 | Burst | 180/68.1 X |
| 3,958,653 | 5/1976 | Arning et al. | 180/157 |
| 4,005,768 | 2/1977 | Bubnash et al. | 188/264 AA |
| 4,036,334 | 7/1977 | Brown | 188/71.6 X |
| 4,155,601 | 5/1979 | Ito | 188/218 A X |
| 4,469,490 | 9/1984 | Wilson | 180/68.2 X |
| 4,473,139 | 9/1984 | Oka et al. | 188/264 AA X |
| 4,503,944 | 3/1985 | Burckhardt et al. | 188/264 W X |
| 4,653,788 | 3/1987 | DiGiusto | 293/117 |
| 4,742,884 | 5/1988 | Ishikawa | 296/208 X |

FOREIGN PATENT DOCUMENTS

| | | | |
|---|---|---|---|
| 1220271 | 6/1966 | Fed. Rep. of Germany . | |
| 2830450 | 2/1979 | Fed. Rep. of Germany | 188/264 R |
| 3321750 | 12/1984 | Fed. Rep. of Germany . | |
| 3525627 | 3/1986 | Fed. Rep. of Germany | 188/264 R |
| 2281520 | 3/1976 | France . | |
| 0040916 | 4/1978 | Japan | 296/15 |
| 0112348 | 9/1981 | Japan | 188/71.6 |

Primary Examiner—Douglas C. Butler
Attorney, Agent, or Firm—Barnes & Thornburg

[57] ABSTRACT

An arrangement for supplying cooling air to a brake disk of a front wheel brake comprises an air guiding duct that is developed to be partially flexible and, on the inlet side, has an air opening in the front end of a motor vehicle and, on the outlet side, has another air opening that is directed at the brake disk. Two air inlet openings in a brake disk guard plate are opposite said air opening and form a separate transversely directed air guiding system to the brake disk. The air guiding duct is provided with several rigid duct portions that are held so that they are be fixed at the vehicle, namely at the vehicle body, as well as at the wheel, namely at the wishbone, as well as adjacent to the brake disk at a guard plate. They are each connected with one another via flexible intermediate duct portions, in which case the rigid duct portions can be moved relative to one another together with their assorted vehicle components.

12 Claims, 4 Drawing Sheets

ARRANGEMENT FOR SUPPLYING COOLING AIR TO A BRAKE DISK

BACKGROUND AND SUMMARY OF THE INVENTION

The invention relates to an arrangement for supplying cooling air to a brake disk of a vehicle wheel brake.

For the air cooling of brakes in motor vehicles, devices are known from German Published Unexamined Patent Application (DE-OS) No. 12 20 271 and U.S. Pat. No. 2,959,255 that are fastened at the motor vehicle body and supply the air directly to the brake via flexible hose lines. Fixedly installed air pipes are also known from U.S. Pat. No. 2,934,255 that in bent areas are developed as corrugated pipes.

An objective of the invention is to provide an air-guiding duct for the forced air cooling of brakes that, despite a relatively large air flow cross-section, avoids an impairment of moving vehicle parts, such as the links, the drive shaft and the wheel, and extends without any impairment, from the direction of the front end of the vehicle to the front wheel brake. In addition, it is contemplated to arrange the duct in a space-saving way and with parts that can be easily assembled and that in part permit a pre-assembly outside the vehicle, but which can also easily be separated from one another during a dismounting of structural elements.

According to the invention, these objectives are achieved by providing an air duct arrangement which includes a plurality of rigid duct parts connected to vehicle parts for movement therewith and a plurality of flexible duct parts interconnecting the rigid duct parts. In especially preferred embodiments, the rigid duct parts are connected respectively to the vehicle front body part, a vehicle wheel support wishbone part and a brake disk guard plate.

The main advantages achieved by means of the invention are that the air guiding duct is fastened at the moving parts, such as the wheel guide link or wheel, so that impacts via the airguide duct parts against these moving parts are avoided. The fastening of the central rigid duct portion directly on the link, in the case of an all-wheel drive vehicle, also has the advantage that the small space in this area of the body is utilized optimally, and the drive shaft located above it takes up an optimal position and is also not impaired. The central as well as the rear rigid duct portion may also, before the installation, be pre-assembled so that for the achieving of a continuous air guiding duct at the vehicle, only the flexible portions must be inserted and connected with the rigid duct portions.

The resulting air guiding system via the duct is uninterrupted from the front end to the brake disk. In the area directly behind the brake disk, a large area is acted upon by means of two transversely directed air currents. These air currents guide the cooling air into the brake area as well as into the ducts between the two brake disk rings, whereby an optimized cooling of the whole brake disk is ensured.

Other objects, advantages and novel features of the present invention will become apparent from the following detailed description of the invention when considered in conjunction with the accompanying drawings.

DETAILED DESCRIPTION OF THE DRAWINGS

Figure 1:
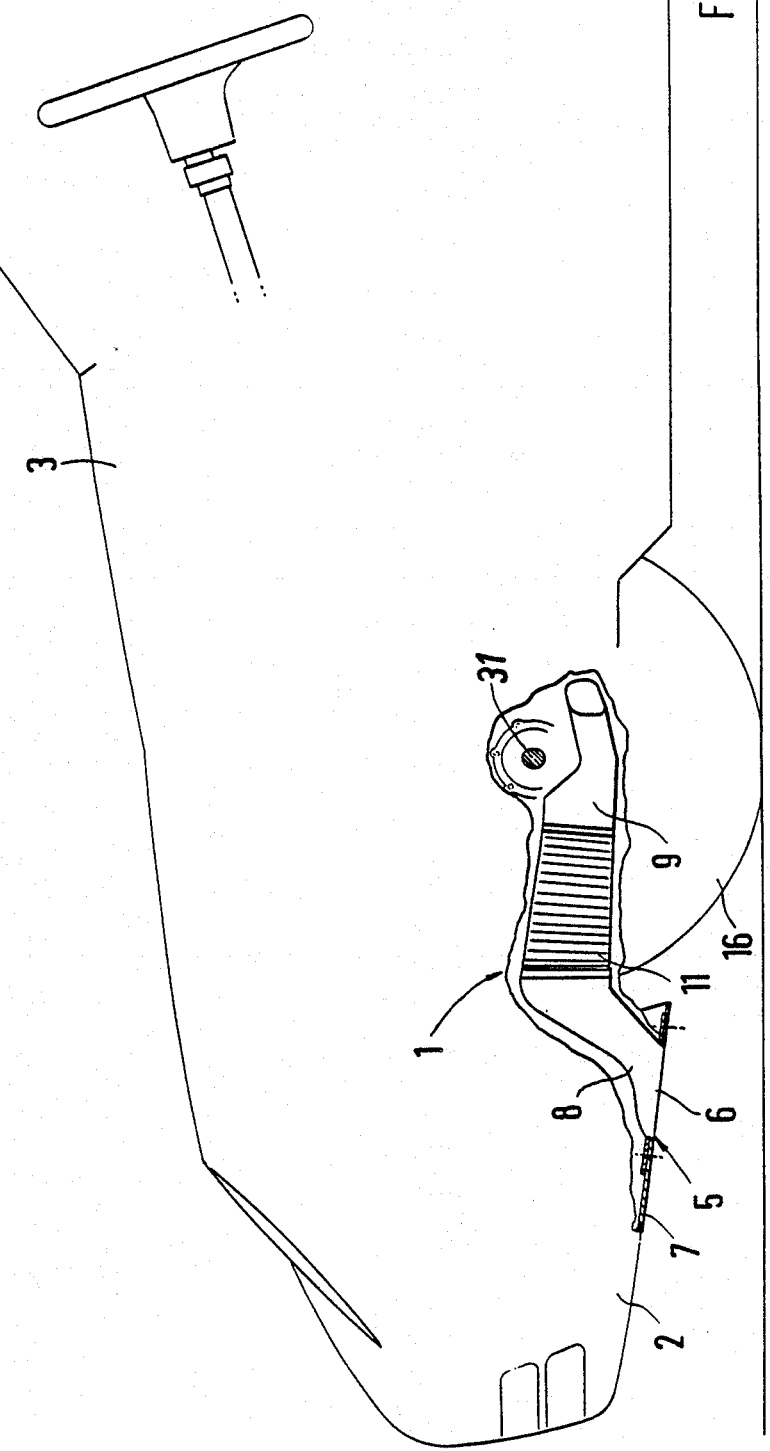
FIG. 1 is a partial schematic part sectional lateral view of a motor vehicle having an air guiding duct constructed in accordance with a preferred embodiment of the invention.
Figure 2:
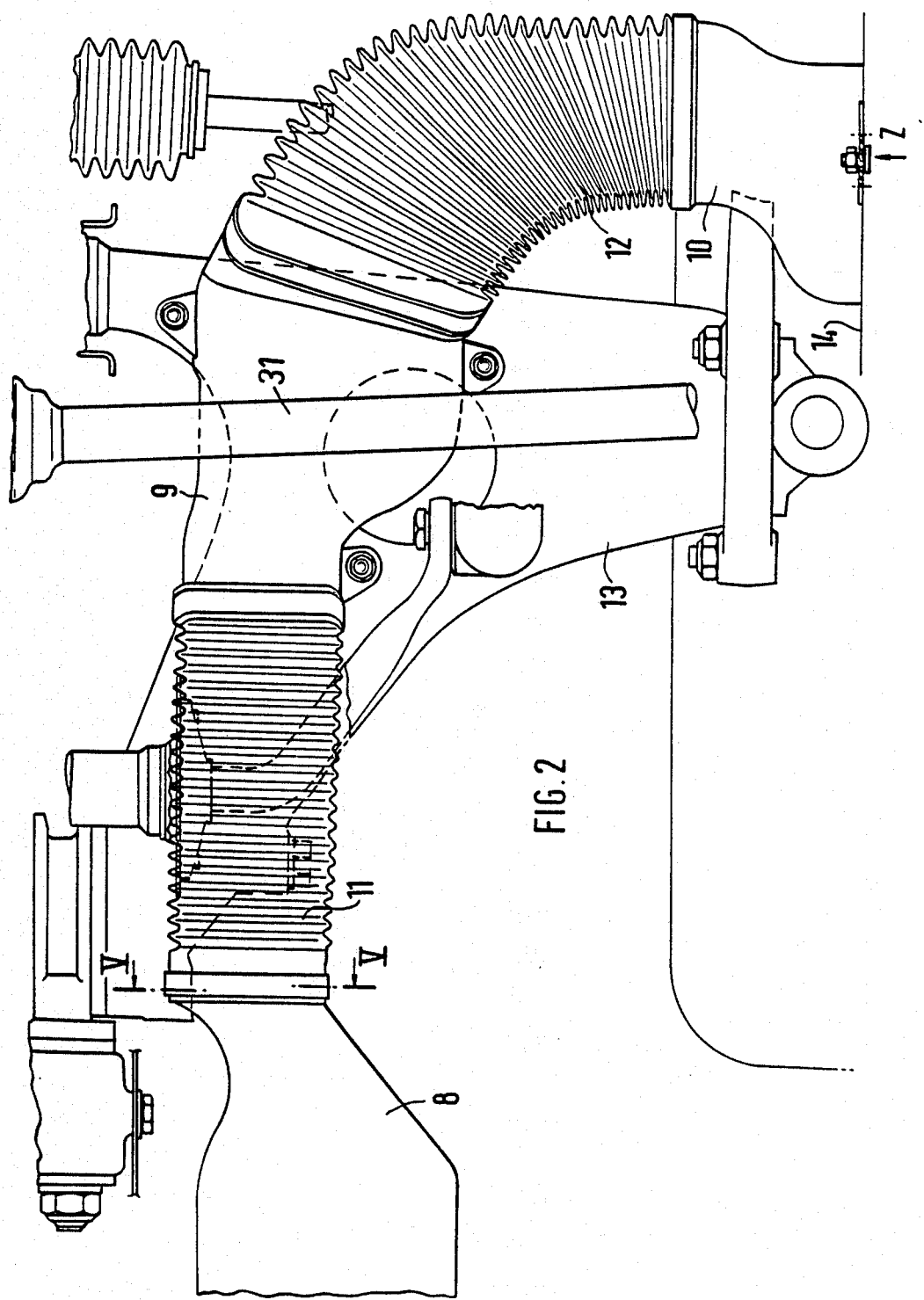
FIG. 2 is a top schematic view of an air guiding duct constructed in accordance with a preferred embodiment of the present invention.
Figure 3:
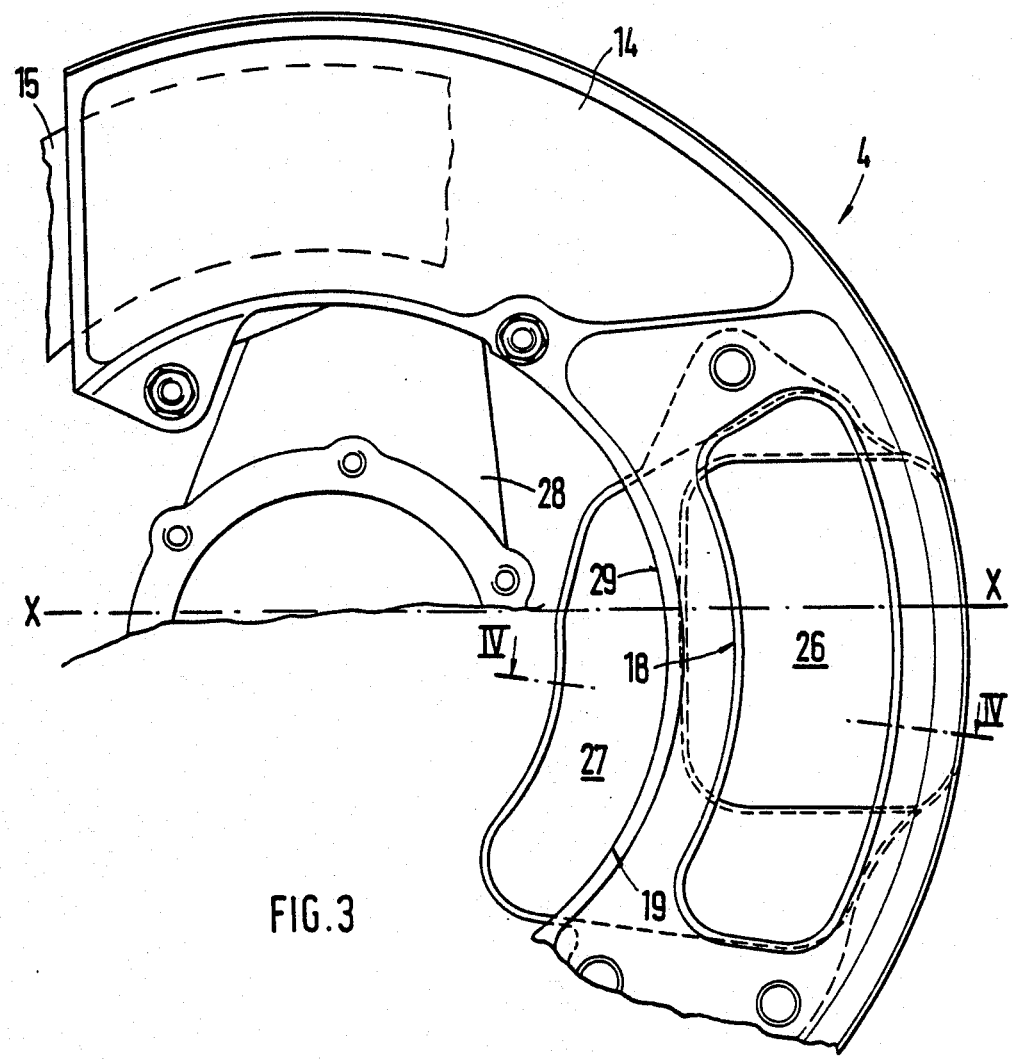
FIG. 3 is a partial view taken in the direction of the Arrow Z of FIG. 2.

As shown in FIG. 1, an air guiding duct 1 is developed to be uninterrupted from a front end 2 of a vehicle 3 to the brake. Cooling air inflow 5 is via an inlet opening 6 in a lower endplate of vehicle body 7. The duct 1 comprises essentially several rigid duct portions 8, 9 and 10 that, via flexible intermediate portions 11 and 12, are connected with one another to form the continuous air guiding duct 1.

Figure 5:
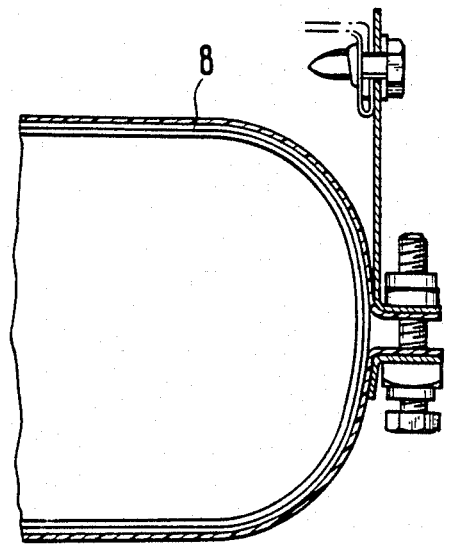
FIG. 5 is a sectional view taken along the Line V—V of FIG. 2 through the rigid front duct portion.

The central and the rear rigid duct portion 9 and 10 are in each case fastened adjacent the wheel, portion 9 being connected with the wishbone 13 and the other portion 10 being connected with guard plate 14 of brake disk 15 by means of screws. The third rigid duct portion 8 that is located in the front is held at the endplate of the body 7 and, in addition, is supported at a holding means in the direction of the body, as shown in detail in FIG. 5.

The air guiding duct 1 is arranged in such a way that it extends from the front end 2 of the vehicle 3, via the wishbone 13, to the brake disk 15, the outlet opening 17 of the duct 1 being disposed approximately in a horizontal central plane X—X of the wheel 16 or of the brake disk 15. In preferred illustrated embodiments, the duct 1 is arranged between the wishbone 13 and a drive shaft 31 such that the drive shaft 31 remains unobstructed in a narrow space.

The front rigid duct portion 8 extends from the inlet opening 5 to the flexible duct portion 11 approximately with an identical cross-section. The rear duct portion is preferably developed as a diffusor, the outlet opening 17 of which is opposite two inlet openings 18 and 19 in the guard plate 14. These air inlet openings 18 and 19 are formed by two curved opening slots 26 and 27, in which case the outer opening slot 26 is arranged in the area of an inner brake surface 25 of the brake disk 15, and the other, inner opening slot 27 is located between a wheel carrier 28 and an inner boundary edge 29 of the guard plate 14 in the area of an open brake hub 30.

Figure 4:
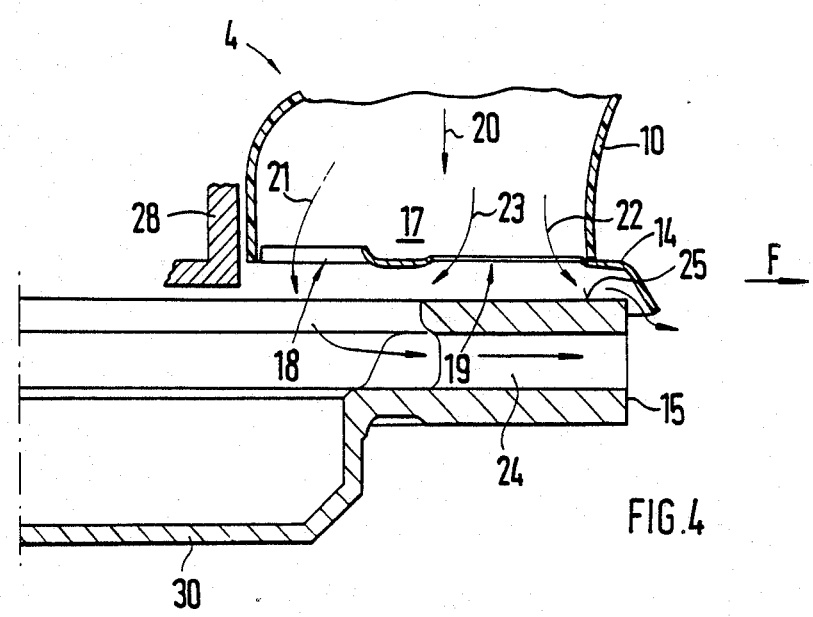
FIG. 4 is a sectional view taken along the Line IV—IV of FIG. 3.

The inlet openings 18 and 19 divide the arriving air flow 20 into an inner air flow 21 and an outer air flow 22, the air flow 22 having a partial flow 23 that can supplement the inner air flow 21. As a result, an optimum supply of cooling air is achieved into the radial ducts 24 between the two brake disk rings as well as to the outer brake disk surface 25, as shown in detail in FIG. 4.

The rigid duct portions 8, 9 and 10 move corresponding to the movement of the components at which they are fastened, in which case, by means of the flexible intermediate portions 11 and 12, relative movements are accommodated in such a way that a continuous air guiding duct 1 is always ensured. These flexible intermediate portions are formed preferably of flexible hoses that consist of plastic and have wire insertions. As a result, it is achieved that, for example, in the case of a steering angle movement of the wheel, the rigid duct portion 10 that is located in the rear, can adjust itself corresponding to the movement of the wheel, in which case the central duct portion 9 simultaneously adjusts itself corresponding to the compression. By means of the flexible intermediate portions 11, 12 a continuous air guiding is achieved without any substantial reduction of the cross-section of the duct 1 in any position of the duct portions 8, 9 and 10.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An air guiding duct arrangement for the feeding of cooling air to a brake disk at a vehicle wheel brake of a vehicle wheel, said air guiding duct arrangement having an air inlet opening disposed in a front end of a motor vehicle at a position in front of the vehicle wheel brake and an air outlet opening that is directed toward the wheel brake disk when in an in-use position on a vehicle, said air guiding duct arrangemnt comprising:

a plurality of rigid duct portions that are fixedly attachable at vehicle parts, at least one of said rigid duct portions being fixedly attachable to a vehicle part which moves relative to other vehicle parts in response to vehicle wheel and wheel brake movements in driving operations, and flexible intermediate duct portions interconnecting the rigid duct portions in such a way that the rigid duct portions can be moved relative to one another during operation of the vehicle while maintaining a continuous duct from the air inlet opening to the air outlet opening, wherein the rigid duct portions include first, second and third rigid duct portions, wherein said first rigid duct portion is fixedly attachable to a front vehicle part and defines said air inlet opening at the forward end thereof, wherein the second rigid duct portion is fixedly attachable to a wishbone of a wheel suspension system for the vehicle wheel, wherein the third rigid duct portion is fixedly attachable to a guard plate for the brake disk, wherein a first of the flexible intermediate duct portions is interconnected between the first and second rigid duct portions, and wherein a second of said flexible intermediate duct portions is interconnected between the second and third rigid duct portions.

2. An arrangement according to claim 1, wherein a rear end part of the third rigid duct portion is formed as a diffusion with increasing cross-section in the downstream direction with said air outlet opening being at its maximum cross-sectional area.

3. An arrangement according to claim 2, wherein said inlet opening extends downwardly through a lower end plate attached to the vehicle body.

4. An arrangement according to claim 2, wherein the inlet opening extends downwardly through a lower end plate attached to the vehicle body.

5. An arrangement according to claim 4, wherein said vehicle wheel is a front vehicle wheel.

6. An arrangement according to claim 5, wherein said first and second flexible intermediate duct portions are formed of flexible hoses which comprise plastic having wire insertions.

7. An arrangement according to claim 1, wherein the inlet opening extends downwardly through a lower end plate attached to the vehicle body.

8. An arrangement according to claim 1, wherein said vehicle wheel is a front vehicle wheel.

9. An arrangement according to claim 1, wherein said air outlet opening is disposed opposite a plurality of guard plate air inlet openings to the guard plate which form an air guiding system to the brake disk which extends in the tranverse direction of the vehicle.

10. An arrangement according to claim 9, wherein the guard plate air inlet openings comprise two curved opening slots in the guard plate, and one of said opening slots being an outer opening slot arranged in an area of an inner brake surface of the brake disk, and the other said opening slots being an inner opening slot formed between a wheel carrier and an inner boundary edge of the guard plate in the area of an open brake hub.

11. An arrangement according to claim 9, wherein said first and second flexible intermediate duct portions are formed of flexible hoses which comprise plastic having wire insertions.

12. An arrangement according to claim 1, wherein said first and second flexible intermediate duct portions are formed of flexible hoses which comprise plastic having wire insertions.

* * * * *